(12) United States Patent
Zhang et al.

(10) Patent No.: US 11,934,285 B2
(45) Date of Patent: Mar. 19, 2024

(54) IDENTIFICATION/COMMUNICATION INTERFACE BETWEEN CONSUMER ELECTRONIC DEVICES AND ACCESSORY DEVICES

(71) Applicant: GOOGLE LLC, Mountain View, CA (US)

(72) Inventors: Haoxing Zhang, Campbell, CA (US); Dietrich Shing-Quan Ho, Mountain View, CA (US); Hung-Yang Lee, New Taipei (TW); William Saperstein, San Carlos, CA (US)

(73) Assignee: Google LLC, Mountain View, CA (US)

( * ) Notice: Subject to any disclaimer, the term of this patent is extended or adjusted under 35 U.S.C. 154(b) by 555 days.

(21) Appl. No.: 17/151,015

(22) Filed: Jan. 15, 2021

(65) Prior Publication Data

US 2022/0232154 A1     Jul. 21, 2022

(51) Int. Cl.
*G06F 11/30* (2006.01)
*G06F 1/3287* (2019.01)
(Continued)

(52) U.S. Cl.
CPC ........ *G06F 11/3051* (2013.01); *G06F 1/3287* (2013.01); *G06F 13/20* (2013.01);
(Continued)

(58) Field of Classification Search
CPC ............... G06F 1/3287; G06F 11/2247; G06F 11/3051; G06F 13/20; G06F 13/4022;
(Continued)

(56) References Cited

U.S. PATENT DOCUMENTS 6,856,046 B1 * 2/2005 Scarlett .................. H01R 29/00
                                                                    439/668
7,865,629 B1 * 1/2011 Tantos ................ G06F 13/4068
                                                                    710/11
(Continued)

OTHER PUBLICATIONS

"TPA6166A2 3.5-mm Jack Detect and Headset Interface IC". SLAS997B. Jan. 2015. Texas Instruments Incorporated. (Year: 2015).*

(Continued)

*Primary Examiner* — Thomas J. Cleary
(74) *Attorney, Agent, or Firm* — Colby Nipper PLLC

(57) ABSTRACT

An accessory interface for an electronic host device includes a digital communication bus including a plurality of communication lines configured to pass data between the electronic host device and an electronic accessory device. The accessory interface further includes detection circuitry selectively coupled to the plurality of communication lines via a multiplexer and configured to detect analog voltage levels across the plurality of communication lines, determine a device type of the electronic accessory device based on the detected analog voltage levels, and control the multiplexer to couple the plurality of communication lines to a host processor of the electronic host device upon determining the device type of the electronic accessory device. The host processor is configured to receive the device type of the electronic accessory device and transmit data via the plurality of communication lines to the electronic accessory device in accordance with the device type of the electronic accessory device.

20 Claims, 5 Drawing Sheets

(51) Int. Cl.
G06F 13/20 (2006.01)
G06F 13/40 (2006.01)
G06F 13/42 (2006.01)
H04N 23/60 (2023.01)

(52) U.S. Cl.
CPC ...... G06F 13/4022 (2013.01); G06F 13/4068 (2013.01); G06F 13/4081 (2013.01); G06F 13/4282 (2013.01); G06F 13/4291 (2013.01); H04N 23/60 (2023.01); G06F 2213/0016 (2013.01)

(58) Field of Classification Search
CPC ............. G06F 13/4068; G06F 13/4282; G06F 13/4291; G06F 2213/0016; G06F 13/4081; G06F 13/4086; H04N 23/60
See application file for complete search history.

(56) References Cited

U.S. PATENT DOCUMENTS

| | | | |
|---|---|---|---|
| 9,223,742 B2* | 12/2015 | Mullins | G06F 3/00 |
| 2003/0162497 A1 | 8/2003 | Curtiss et al. | |
| 2005/0249354 A1 | 11/2005 | Patino et al. | |
| 2009/0031048 A1 | 1/2009 | Richards et al. | |
| 2011/0057711 A1* | 3/2011 | Hung | H04M 1/72409 |
| | | | 327/365 |
| 2011/0093643 A1* | 4/2011 | Hung | G06F 13/409 |
| | | | 710/316 |
| 2011/0099298 A1* | 4/2011 | Chadbourne | H04R 1/1041 |
| | | | 710/16 |
| 2012/0051562 A1 | 3/2012 | Kim | |
| 2012/0246350 A1 | 9/2012 | Lee | |
| 2012/0249119 A1 | 10/2012 | Wada et al. | |
| 2012/0265911 A1* | 10/2012 | Connolly | G06F 13/387 |
| | | | 710/300 |
| 2012/0290742 A1* | 11/2012 | Sun | G06F 3/165 |
| | | | 710/11 |
| 2014/0004807 A1 | 1/2014 | Harmke | |
| 2014/0270201 A1* | 9/2014 | Kocalar | H04R 1/1041 |
| | | | 381/58 |
| 2015/0220475 A1 | 8/2015 | Amarilio et al. | |
| 2015/0304769 A1* | 10/2015 | Weijand | H04R 29/001 |
| | | | 381/123 |
| 2016/0224504 A1* | 8/2016 | Abdelsamie | G06F 13/4282 |
| 2016/0328337 A1 | 11/2016 | Su et al. | |
| 2016/0364360 A1 | 12/2016 | Lim | |
| 2017/0026752 A1* | 1/2017 | Jung | H04R 5/04 |
| 2017/0359631 A1 | 12/2017 | Seiler et al. | |
| 2018/0203782 A1* | 7/2018 | White | G06F 11/006 |
| 2018/0317340 A1 | 11/2018 | Takemoto | |
| 2020/0174963 A1 | 6/2020 | Panshin et al. | |

OTHER PUBLICATIONS

"Extended European Search Report", EP Application No. 22151454.0, dated Jun. 9, 2022, 16 pages.

* cited by examiner

Table 300

R3 = R4 = 4.747 kOhm

| Accessory ID | Comm. Line 131 | | Comm. Line 132 | |
|---|---|---|---|---|
| | R1 | Voltage | R2 | Voltage |
| 0 (nothing attached) | OPEN | VDD | OPEN | VDD |
| 1 | OPEN | VDD | 37.4 kOhm | 0.887*VDD |
| 2 | OPEN | VDD | 80.6 kOhm | 0.944*VDD |
| 3 | 37.4 kOhm | 0.887*VDD | OPEN | VDD |
| 4 | 37.4 kOhm | 0.887*VDD | 37.4 kOhm | 0.887*VDD |
| 5 | 37.4 kOhm | 0.887*VDD | 80.6 kOhm | 0.944*VDD |
| 6 | 80.6 kOhm | 0.944*VDD | OPEN | VDD |
| 7 | 80.6 kOhm | 0.944*VDD | 37.4 kOhm | 0.887*VDD |
| 8 | 80.6 kOhm | 0.944*VDD | 80.6 kOhm | 0.944*VDD |

Figure 3

| Comm. Line 131 | Comm. Line 132 | Accessory ID |
|---|---|---|
| VDD | VDD | 0 (nothing attached) |
| VDD | 0.887*VDD | 1 |
| VDD | 0.944*VDD | 2 |
| 0.887*VDD | VDD | 3 |
| 0.887*VDD | 0.887*VDD | 4 |
| 0.887*VDD | 0.944*VDD | 5 |
| 0.944*VDD | VDD | 6 |
| 0.944*VDD | 0.887*VDD | 7 |
| 0.944*VDD | 0.944*VDD | 8 |

Table 400

Figure 4

IDENTIFICATION/COMMUNICATION INTERFACE BETWEEN CONSUMER ELECTRONIC DEVICES AND ACCESSORY DEVICES

TECHNICAL FIELD

This relates to a communication interface between consumer electronic devices and accessories.

BACKGROUND

In the market of consumer electronic devices (e.g., cameras), adding modular accessory devices to the core product may provide more functionality and increase options for customization. With an expanding ecosystem of accessory devices for a given core product, interface mechanisms must be developed and supported in order to allow the core device to detect and communicate with the different types of accessory devices in the ecosystem. Such mechanisms may add hardware requirements, thereby increasing cost and adding inefficiencies in the modular design.

SUMMARY

This disclosure describes an interface configured to support accessory device detection, identification, and communication with minimum added cost and optimized efficiency. The interface leverages the physical connections of a digital communication bus (e.g., I²C) for accessory detection/identification, which requires no additional hardware connections and is thus more cost effective. A core device implementing such an interface does not require separate signals for purposes of detecting and identifying accessory devices. As such, a core device implementing such an interface can recognize and communicate with different types of accessories using the communication bus. Further, a core device implementing such an interface may detect and identify an accessory device before the accessory device powers on, which increases efficiency.

In one aspect, an accessory interface for an electronic host device comprises a digital communication bus including a plurality of communication lines configured to pass data between the electronic host device and an electronic accessory device. The accessory interface further comprises detection circuitry selectively coupled to the plurality of communication lines via a multiplexer. The detection circuitry is configured to detect analog voltage levels across the plurality of communication lines, determine a device type of the electronic accessory device based on the detected analog voltage levels, and control the multiplexer to couple the plurality of communication lines to a host processor of the electronic host device upon determining the device type of the electronic accessory device. The host processor is configured to receive the device type of the electronic accessory device from the detection circuitry, and transmit data via the plurality of communication lines to the electronic accessory device in accordance with the device type of the electronic accessory device.

The detected analog voltage levels may include (i) a first analog voltage level across a first of the plurality of communication lines and (ii) a second analog voltage level across a second of the plurality of communication lines. The detection circuitry may determine the device type of the electronic accessory device based on a mapping of the first analog voltage level and the second analog voltage level to the device type in a lookup table stored in memory of the detection circuitry. The first analog voltage level may be set by a first resistor divider circuit including (i) a first pull-up resistor included in the electronic host device and (ii) a first pull-down resistor included in the electronic accessory device. The second analog voltage level may be set by a second resistor divider circuit including (i) a second pull-up resistor included in the electronic host device and (ii) a second pull-down resistor included in the electronic accessory device. The first and second pull-up resistors may have fixed resistance values that are independent of the device type of the electronic accessory device, and the first and second pull-down resistors may have resistance values corresponding to the device type of the electronic accessory device.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 3 is a table that maps interface resistor values and communication line voltages to accessory identifiers in accordance with some implementations.

FIG. 4 is a table that maps communication line voltages to accessory identifiers in accordance with some implementations.

DETAILED DESCRIPTION

Figure 1:
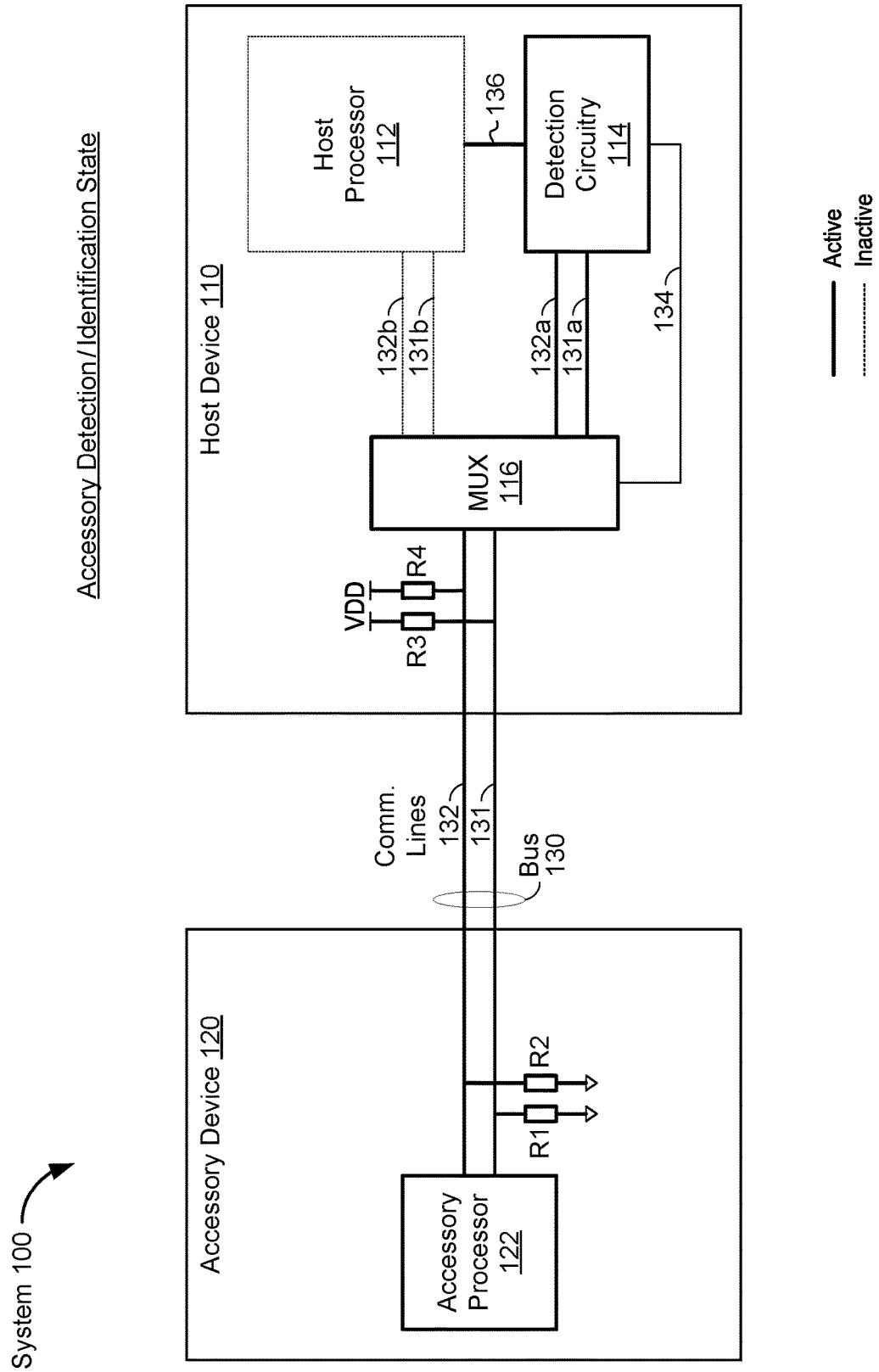
FIG. 1 is a system including an accessory device and a host device in a detection/identification state in accordance with some implementations.

FIG. 1 is a system 100 including an electronic host device 110 and an electronic accessory device 120 in accordance with some implementations.

The host device 110 is an electronic device, also referred to as a core device, master device, or main device. In general, the host device 110 may be any consumer or non-consumer electronic device having one or more functions that may be enhanced or supplemented by the addition of an accessory device 120 designed to interface with the host device 110. For example, the host device 110 may be a battery-powered or wired indoor or outdoor camera.

The accessory device 120 is an electronic device, also referred to as an accessory, a slave device, or a secondary device. In general, the accessory device 120 may be any consumer or non-consumer electronic device having a function that may enhance or supplement a corresponding function of a host device 110, or perform a function that the host device 110 cannot perform on its own. For the example in which the host device 110 is a camera, the accessory device 120 may be a camera stand (e.g., including camera control functionality), a supplemental power supply (e.g., an external battery or a solar panel), a floodlight (e.g., having motion sensing functionality), or any other accessory including electronics that enhance or supplement any of the functionality of the main camera device. The accessory device 120 has the ability to handle commands received from the host device 110. For example, if the host device 110 is a camera and the accessory device 120 is a floodlight, the floodlight may implement functions such as lighting schedules, sensitivity to motion, and brightness of illumination by executing commands received from the camera.

The host device 110 and accessory device 120 may be physically coupled to each other via an accessory interface comprising a communication bus 130, which includes a plurality of communication lines 131 and 132. The communication lines are physical connections through which digital communications may be passed between a host processor 112 of the host device and an accessory processor 122 of the accessory device. The communication bus 130 may pass data signals using a digital communication protocol such as inter-integrated circuit (I²C) or serial peripheral interface (SPI). While the communication bus 130 in the system 100 includes two communication lines 131 and 132 (e.g., a serial clock line (SCL) and a serial data line (SDA) for I²C communications), the communication bus 130 in other implementations may use any number of communication lines, depending on the underlying communication protocol being used by the host processor 112 and the accessory processor 122.

The host device 110 includes a host processor 112. The host processor 112 is the main processing unit of the host device 110. For example, the host processor 112 is a microcontroller or a system on a chip (SOC). The host processor 112 controls the functionality of the host device 110 and the accessory device 120 by executing one or more programs stored in memory of the host device 110 (not shown). Specifically, the host processor directly controls the accessory device 120 after detection circuitry 114 of the host device 110 detects and identifies the accessory device 120 and establishes a communication channel via the communication bus 130 (discussed in more detail below). In some implementations, the host processor 112 is powered off or kept in a low power state (e.g., a sleep mode) while it is not being used in order to save power.

The host device 110 includes detection circuitry 114. The detection circuitry 114 may be a co-processor or microcontroller that monitors the status of the communication lines 131/132, identifies the device type of the accessory device 120, and routes (or causes to be routed) communications passed via the communication lines 131/132 (e.g., control traffic) to the host processor 112 (discussed in more detail below). In some implementations, the detection circuitry 114 may be always powered on since it is more energy efficient than the host processor 112 and is required for detecting accessory devices 120. In some implementations, the detection circuitry includes an analog-to-digital converter (ADC) configured to detect respective analog voltage levels of the communication lines 131/132 and convert them to digital values for use in identifying the device type of the accessory device 120 (described in more detail below).

The host device 110 includes a multiplexer 116. The multiplexer 116 is a signal switch controlled by the detection circuitry 114 (via a control signal 134). The multiplexer 116 routes traffic received via the communication lines 131/132 either to the host processor 112 or to the detection circuitry 114. The multiplexer 116 is defaulted to directing traffic to the detection circuitry 114. If the detection circuitry 114 does not detect an accessory device 120, the detection circuitry 114 does not switch the multiplexer 116.

The host device 110 includes two pull-up resistors R3 and R4, each coupled to a respective communication line 131/132. As such, when there is no accessory device 120 coupled to the host device 110, the voltage levels of the communication lines 131/132 are pulled up to logic high (VDD). The resistance values of R3 and R4 are fixed. More details regarding resistance values are discussed below.

Before an accessory device 120 is attached, the multiplexer 116 directs traffic received via the communication lines 131/132 to the detection circuitry 114, which monitors the state of the communication lines 131/132 (if nothing is asserted, both lines remain high). When an accessory device 120 gets connected to the host device 110, two pull-down resistors R1 and R2 in the accessory device 120 form respective voltage paths between VDD and ground. The detection circuitry 114 detects the voltage levels of the communication lines 131/132 via lines 131a/132a in order to determine the device type of the accessory device 120 (discussed in more detail below). After detecting the device type of the accessory device 120, the detection circuitry 114 toggles the multiplexer 116 to couple the communication lines 131/132 to the host processor 112 via lines 131b/132b.

The accessory device 120 includes an accessory processor 122. The accessory processor 122 may be the main processing unit of the accessory device 120, and it may be a processor, microcontroller, or system on a chip (SOC). The accessory processor 122 receives commands via the communication lines 131/132 from the host processor 112 of the host device 110, and executes the commands locally at the accessory device 120.

The accessory device 120 includes two pull-down resistors R1 and R2, each coupled to a respective communication line 131/132. As such, when the accessory device 120 gets connected to the host device 110, the pull-down resistors R1 and R2 in the accessory device 120 form respective voltage paths between VDD and ground. The resistance values of R1 and R2 are unique to the device type of the accessory device 120 (also referred to as the accessory type, accessory identifier, or accessory ID). Different combinations of resistance values of R1 and R2 correspond to different device types for accessory devices 120. The resistance values of R1 and R2 form respective resistor dividers with the pull-up resistors R3 and R4 when the accessory device 120 gets connected to the host device 110. As such, the resistance values of R1 and R2 directly influence the respective voltage levels measured by the detection circuitry 114 of each respective communication line 131/132, therefore providing a basis for identifying the device type of the accessory device 120 (described in more detail below).

Figure 2:
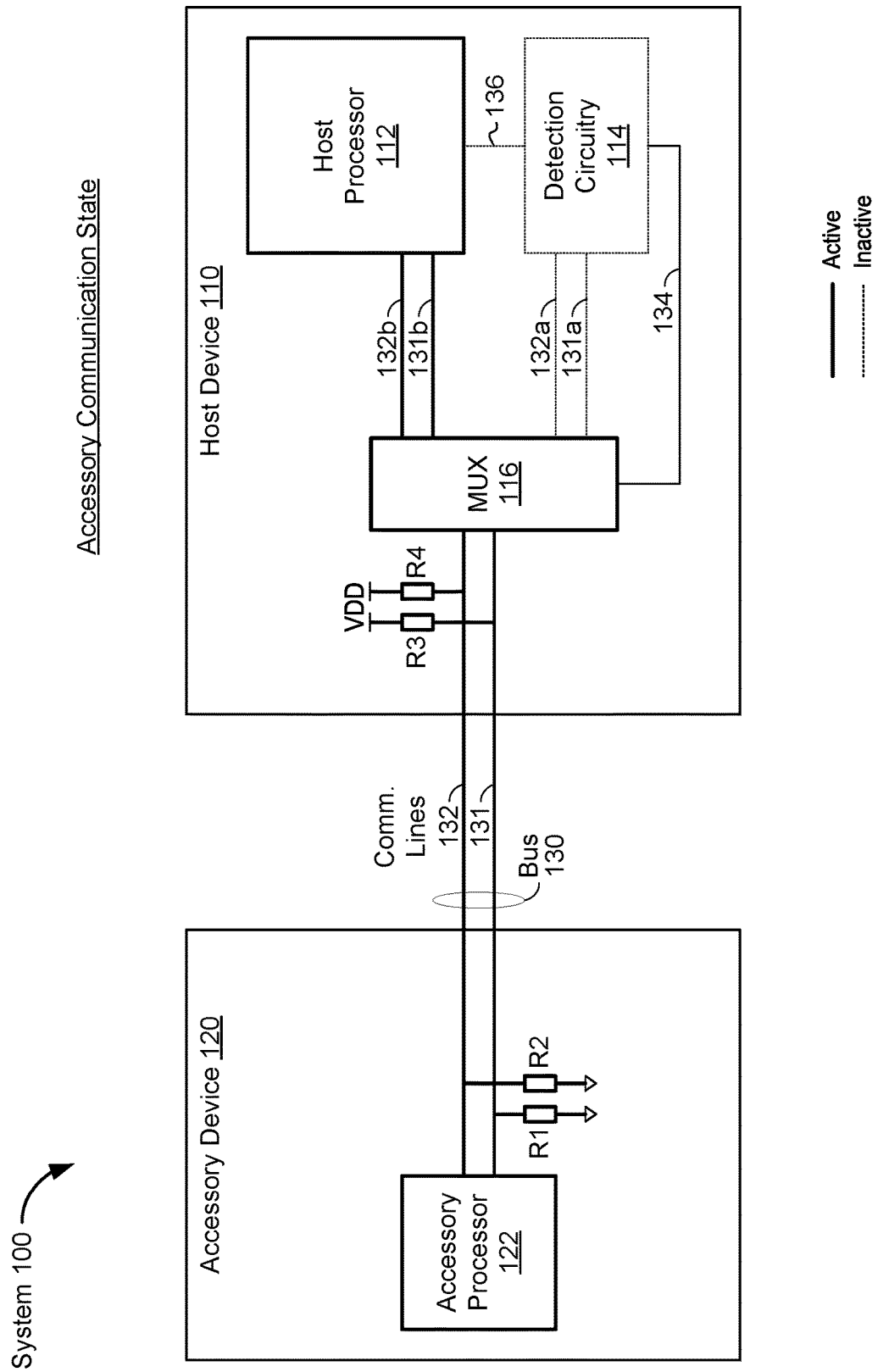
FIG. 2 is a system including an accessory device and a host device in a communication state in accordance with some implementations.

The host device 110 works in two major states: (i) an accessory detection/identification state as depicted in FIG. 1, and (ii) an accessory communication state as depicted in FIG. 2. In each figure, thicker lines depict active signals and blocks, and thinner lines depict inactive signals and blocks.

FIG. 1 depicts the accessory detection/identification state, which is the starting state for the host device 110. In this state, the detection circuitry 114 routes signals received via the communication lines 131/132 to its ADC through the multiplexer 116.

Before an accessory device 120 is attached to the host device 110, respective voltage levels on the communication lines 131/132 are pulled up to logic high (VDD). The detection circuitry 114 monitors the voltage levels on these two lines regularly to determine whether an accessory device 120 is attached to the host device 110.

After an accessory device 120 is attached to the host device 110, the pull-down resistors R1 and R2 in the accessory device 120 pull down the respective voltage levels on the communication lines 131/132 by forming respective resistor dividers with the pull-up resistors R3 and R4 in the host device 110. Specifically, the voltage level of communication line 131 is equal to R1/(R1+R3)*VDD, and the voltage level of communication line 132 is equal to R2/(R2+R4)*VDD. Depending on the resistance values of the pull-down resistors R1 and R2, the detection circuitry 114 will measure different voltage levels on the communication lines 131/132.

The detection circuitry 114 looks up the voltage levels in a predefined table (e.g., table 400, FIG. 4) stored in memory of the detection circuitry (not shown) and determines the device type (accessory ID) of the accessory device 120 by matching the voltage levels to the accessory ID. The detection circuitry 114 then communicates the determined accessory ID to the host processor 112 (via inter-processor signal 136). The host processor 112 may keep a table of valid accessories and various settings and protocols corresponding to each accessory ID.

In some implementations, communicating the determined accessory ID to the host processor 112 includes waking the host processor 112 from a low power state. Upon waking, the host processor 112 receives the accessory ID from the detection circuitry 114.

Upon detecting the accessory device 120 and determining its device type (accessory ID), the detection circuitry 114 toggles the multiplexer 116 (via control signal 134) to route the accessory communication traffic (conveyed via the communication lines 131/132) to the host processor 112 via lines 131b/132b. The toggling of the multiplexer 116 in this manner facilitates switching of the host device 110 to the accessory communication state as shown in FIG. 2.

FIG. 2 depicts the accessory communication state. In this state, the host processor 112 communicates with the accessory processor 122 via the communication lines 131/132 (and coupled through liens 131b/132b) using a communication protocol (e.g., I²C).

Communications between the host processor 112 and the accessory processor 122 may include the transmission of commands and/or data from the host processor 112 to the accessory processor 122 in accordance with the device type of the accessory device 120 (e.g., by transmitting a command or data that is specific to the device type of the accessory device 120, such as an illumination brightness setting for a floodlight accessory or a pan/tilt setting for a camera stand accessory).

The underlying communications protocol between the host processor 112 and the accessory processor 122 may optionally be determined by the device type of the accessory device 120. For example, depending on the requirements associated with a particular Accessory ID, the host processor 112 may indirectly control the multiplexer 116 (through the detection circuitry 114) to route signals on communications on lines 131/132 from a first plurality of communication pins of the host processor 112 (e.g., pins supporting I²C communications) to a second plurality of communication pins of the host processor 112 (e.g., pins supporting SPI or UART communications).

Upon disconnection of the accessory device 120 from the host device 110, the host processor 112 may send an inter-processor control signal 136 to the detection circuitry 114 to indirectly control the multiplexer 116 to switch back to lines 131a/132a, which couples the communication lines 131/132 to the detection circuitry, thereby switching the host device 110 back to the accessory detection state (FIG. 1). The host processor 112 may transition back to the low power state upon causing the multiplexer 116 to toggle the communication lines 131/132 back to the detection circuitry 114.

Optionally, while in the accessory communication state (FIG. 2), the host processor may transition to the low power state, or perform a duty cycle, according to a power-saving protocol. While in the low-power state, the host processor 112 may send a request to the detection circuitry 114 to check that the accessory device 120 is still attached to the host device 110. As a result, the detection circuitry 114 switches the multiplexer 116 to couple the communication liens 131/132 to the detection circuitry 114 via lines 131a/132a. If the detection circuitry 114 determines there is no accessory device 120 attached (e.g., the voltage levels for the communication lines 131/132 are VDD), then the host processor may be prevented from fully powering on, which saves battery life in battery-powered host devices 110.

FIG. 3 is a table 300 depicting example resistor values for the pull-down resistors R1/R2 of the accessory device 120, the pull-up resistors R3/R4 of the host device 110, and an example mapping of the different pull-down resistor values to different accessory IDs. The values of R1 and R2 may be chosen so that they pull down the voltage levels of lines 131/132 by a large enough amount for the detection circuitry 114 (e.g., the ADC) to differentiate between the various voltage levels, while keeping the voltage levels higher than the minimum voltage threshold of both the accessory processor 122 and the host processor 112 communication interfaces.

The resistance values in table 300 are examples, and other resistance values and combinations of resistance values may be chosen as long as they (i) cause the voltage levels for lines 131/132 to meet minimum voltage thresholds for digital communications over the communication lines 131/132 as discussed above, and (ii) cause a difference between successive voltage levels to satisfy a minimum resolution requirement of the ADC of the detection circuitry as discussed above. For example, if the underlying communication protocol is I²C, VDD is 1.8V, and the voltage for lines 131/132 at the accessory device 120 may go down to 1.2V and still satisfy the I²C specification. As such, there is a 0.6V margin (from 0.667*VDD to 1.000*VDD) through which various voltage levels may span.

As described above, the number of different accessory IDs that can be mapped to different voltage combinations may be limited by (i) minimum voltage thresholds for digital communications, and (ii) ADC resolution. In some implementations, additional steps may taken in order to increase the number of different accessory IDs. For instance, in order to support additional accessory device types, each accessory ID in the table 300 may be assigned to a group of accessories (e.g., a camera type). Following the transition to the communication state (FIG. 2), the host processor 112 may communicate with the accessory device 120 via the communication lines 131/132 in order to determine a more specific device type (e.g., a specific model of the camera type). For example, in communicating with the accessory device 120 to determine a more specific device type, the host processor 112 may poll or interrogate a memory (e.g., an electrically erasable programmable read-only memory (EEPROM), not shown) of the accessory device 120 to obtain additional information about the specific type of accessory device 120 (additional device type information corresponding to the more general accessory ID in the table 300).

FIG. 4 is a table 400 depicting a mapping of the various combinations of voltage levels for the communication lines 131/132 to different accessory IDS. The values in table 400 correspond to the values in table 300. Table 400 may be stored in memory included in or otherwise associated with the detection circuitry 114 and/or the host processor 112.

The system 100 as described above allows for live insertion of an accessory device 120 into a host device 110. With the automatic detection features of the detection circuitry 114 and live insertion, the host device 110 may not require additional security overhead, because all of the commands may be driven by the host device 110 (e.g., the camera). Live insertion with a standard interface (e.g., I²C) allows for the use of accessory attachments after-the-fact from a security point of view. In addition, quick configuration changes may be implemented with live insertion. For example, as soon as a floodlight (accessory device 120) is plugged into a camera (host device 110), the camera may detect/identify the flood light and change the camera's configuration (e.g., turn off power-intensive on-board illumination circuitry).

Figure 5:
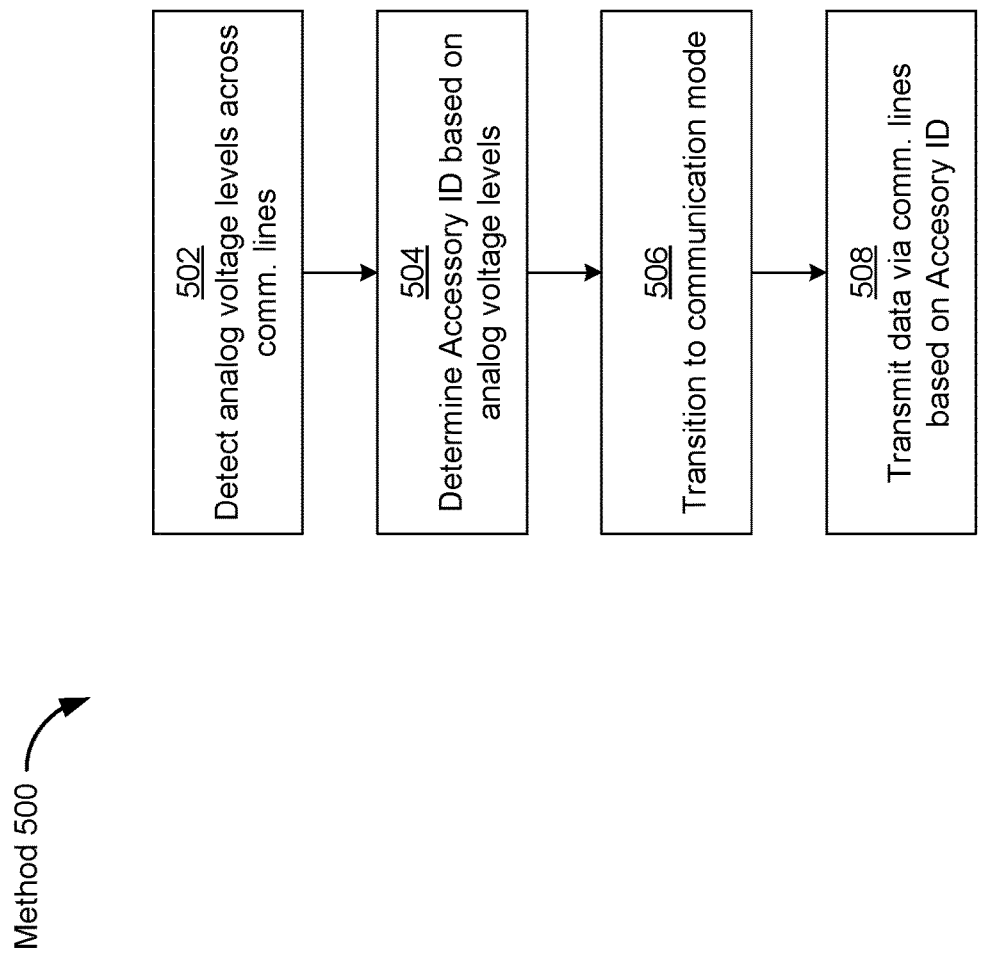
FIG. 5 is a flow diagram illustrating an example method of interfacing an electronic host device with an electronic accessory device in accordance with some implementations.

FIG. 5 is a flow diagram illustrating an example method 500 of interfacing an electronic host device (e.g., 110) with an electronic accessory device (e.g., 120) in accordance with some implementations. Method 500 is, optionally, governed by instructions that are stored in a computer memory or non-transitory computer readable storage medium included in or associated with the host device and/or the accessory device, and that are executed by one or more processors of the host device (e.g., host processor 112 and detection circuitry 114) and/or the accessory device (e.g., accessory processor 122). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by the one or more processors. Some operations in method 500 may be combined and/or the order of some operations may be changed. Reference numbers in the description below may refer to features described above with reference to FIGS. 1-4 to illustrate example features of the various operations recited with reference to method 500.

At detection circuitry 114 selectively coupled, via a multiplexer 116, to a plurality of communication lines 131/132 of a digital communication bus 130 configured to pass data between the electronic host device 110 and the electronic accessory device 120, the detection circuitry 114 detects (operation 502) analog voltage levels across the plurality of communication lines 131/132. The detection circuitry 114 determines (operation 504) a device type of the electronic accessory device based on the detected analog voltage levels (e.g., by looking up the device type in a table 400 indexed by the analog voltage levels). The detection circuitry 114 transitions (operation 506) to a communication mode of the host device 110 by (i) controlling the multiplexer 116 to couple the plurality of communication lines 131/132 to the host processor 112 of the electronic host device 110 upon determining the device type of the electronic accessory device 120 and (ii) transmitting the device type to the host processor 112 (and optionally waking the host processor 112 from a low power state). Upon receiving the device type of the electronic accessory device 120 from the detection circuitry 114, the host processor 112 transmits (operation 508) data and/or commands via the plurality of communication lines 131/132 to the electronic accessory device 120 in accordance with the device type of the electronic accessory device (e.g., transmitting a command that is specific to the device type of the electronic accessory device 120).

In some implementations, the detected analog voltage levels may include (i) a first analog voltage level across a first of the plurality of communication lines and (ii) a second analog voltage level across a second of the plurality of communication lines, and the detection circuitry 114 determines the device type of the electronic accessory device 120 by matching the first analog voltage level and the second analog voltage level (the left and center columns of table 400) to the device type (the right column of table 400) in a lookup table stored in memory of the detection circuitry (table 400).

In some implementations, the first analog voltage level is set by a first resistor divider circuit including (i) a first pull-up resistor R3 included in the electronic host device 110 and (ii) a first pull-down resistor R1 included in the electronic accessory device 120; and the second analog voltage level is set by a second resistor divider circuit including (i) a second pull-up resistor R4 included in the electronic host device 110 and (ii) a second pull-down resistor R2 included in the electronic accessory device 120. The first and second pull-up resistors R3/R4 may have fixed resistance values that are independent of the device type of the electronic accessory device; and the first and second pull-down resistors R1/R2 may have resistance values corresponding to the device type of the electronic accessory device 120.

In some implementations, the detection circuitry 114 includes an ADC configured to detect the first and second analog voltage levels; and the first and second pull-down resistors R1/R2 have resistance values that (i) cause the first and second analog voltage levels to be greater than or equal to a minimum voltage threshold for digital communications over the plurality of communication lines, and (ii) cause a difference between the first and second analog voltage levels to satisfy a minimum resolution requirement of the ADC.

In some implementations, upon receiving the device type of the electronic accessory device from the detection circuitry, the host processor polls a memory of the accessory device to determine additional device type information of the electronic accessory device, and transmits the data via the plurality of communication lines to the electronic accessory device in accordance with the additional device type information of the electronic accessory device.

In some implementations, upon disconnection of the electronic accessory device 120 from the electronic host device 110, the host processor (i) sends a command to the detection circuitry 114 to control the multiplexer 116 to couple the plurality of communication lines 131/132 to the detection circuitry 114, and (ii) transitions to a low power state.

Miscellaneous

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. An accessory interface for an electronic host device, comprising:
   a digital communication bus including a plurality of communication lines configured to pass data between the electronic host device and an electronic accessory device;
   detection circuitry selectively coupled to the plurality of communication lines via a multiplexer, the detection circuitry configured to:
      detect analog voltage levels across the plurality of communication lines;
      determine first accessory identification (ID) information of the electronic accessory device based on the detected analog voltage levels, the first accessory ID information indicating that the electronic accessory is included in a group of accessory devices;
      poll a memory of the accessory device to determine second accessory ID information of the electronic accessory device, the second accessory ID information indicating that the electronic accessory is included in a subset of the group of accessory devices;
      determine a device type of the electronic accessory device based on the first accessory ID information and the second accessory ID information; and
      control the multiplexer to couple the plurality of communication lines to a host processor of the electronic host device upon determining the device type of the electronic accessory device;
   wherein the host processor is configured to:
   receive the device type of the electronic accessory device from the detection circuitry; and
   transmit data via the plurality of communication lines to the electronic accessory device in accordance with the device type of the electronic accessory device.

2. The accessory interface of claim 1, wherein:
   the detected analog voltage levels include (i) a first analog voltage level across a first of the plurality of communication lines and (ii) a second analog voltage level across a second of the plurality of communication lines; and
   the detection circuitry is configured to determine the first accessory ID information of the electronic accessory device based on a mapping of the first analog voltage level and the second analog voltage level to the first accessory ID information in a lookup table stored in memory of the detection circuitry.

3. The accessory interface of claim 2, wherein:
   the first analog voltage level is set by a first resistor divider circuit including (i) a first pull-up resistor included in the electronic host device and (ii) a first pull-down resistor included in the electronic accessory device; and
   the second analog voltage level is set by a second resistor divider circuit including (i) a second pull-up resistor included in the electronic host device and (ii) a second pull-down resistor included in the electronic accessory device.

4. The accessory interface of claim 3, wherein:
   the first and second pull-up resistors have fixed resistance values that are independent of the device type of the electronic accessory device; and
   the first and second pull-down resistors have resistance values corresponding to the device type of the electronic accessory device.

5. The accessory interface of claim 3, wherein:
   the detection circuitry comprises an analog-to-digital converter (ADC) configured to detect the first and second analog voltage levels; and
   the first and second pull-down resistors have resistance values that:
      cause the first and second analog voltage levels to be greater than or equal to a minimum voltage threshold for digital communications over the plurality of communication lines, and
      cause a difference between the first and second analog voltage levels to satisfy a minimum resolution requirement of the ADC.

6. The accessory interface of claim 1, wherein:
   the electronic host device is a camera; and the electronic accessory device is a camera stand, a solar panel, or a floodlight.

7. The accessory interface of claim 1, wherein:
   the digital communication bus is an inter-integrated circuit (I.sup.2C) bus;
   a first of the plurality of communication lines is a serial clock line (SCL); and
   a second of the plurality of communication lines is a serial data line (SDA).

8. The accessory interface of claim 1, wherein the host processor is configured to transmit the data to the electronic accessory device in accordance with the device type of the electronic accessory device by transmitting a command that is specific to the device type of the electronic accessory device.

9. The accessory interface of claim 1, wherein the host processor is further configured to wake from a low power state upon receiving the device type of the electronic accessory device from the detection circuitry.

10. The accessory interface of claim 1, wherein upon disconnection of the electronic accessory device from the electronic host device, the host processor is further configured to (i) send a command to the detection circuitry to control the multiplexer to couple the plurality of communication lines to the detection circuitry, and (ii) transition to a low power state.

11. The accessory interface of claim 1, wherein:
   the first accessory ID information of the electronic accessory device comprises a general device category; and
   the second accessory ID information of the electronic accessory device comprises a more-specific category, including the device type.

12. A method of interfacing an electronic host device with an electronic accessory device, the method comprising:
   at detection circuitry selectively coupled, via a multiplexer, to a plurality of communication lines of a digital communication bus configured to pass data between the electronic host device and the electronic accessory device:
      detecting analog voltage levels across the plurality of communication lines;
      determining first accessory identification (ID) information of the electronic accessory device based on the detected analog voltage levels, the first accessory ID information indicating that the electronic accessory is included in a group of accessory devices;

polling a memory of the accessory device to determine second accessory ID information of the electronic accessory device, the second accessory ID information indicating that the electronic accessory is included in a subset of the group of accessory devices;

determining a device type of the electronic accessory device based on the first accessory ID information and the second accessory ID information; and controlling the multiplexer to couple the plurality of communication lines to a host processor of the electronic host device upon determining the device type of the electronic accessory device; and at the host processor:

receiving the device type of the electronic accessory device from the detection circuitry; and transmitting data via the plurality of communication lines to the electronic accessory device in accordance with the device type of the electronic accessory device.

13. The method of claim 12, wherein:
the detected analog voltage levels include (i) a first analog voltage level across a first of the plurality of communication lines and (ii) a second analog voltage level across a second of the plurality of communication lines; and the detection circuitry determines the first accessory ID information of the electronic accessory device by matching the first analog voltage level and the second analog voltage level to the first accessory ID information in a lookup table stored in memory of the detection circuitry.

14. The method of claim 13, wherein:
the first analog voltage level is set by a first resistor divider circuit including (i) a first pull-up resistor included in the electronic host device and (ii) a first pull-down resistor included in the electronic accessory device; and the second analog voltage level is set by a second resistor divider circuit including (i) a second pull-up resistor included in the electronic host device and (ii) a second pull-down resistor included in the electronic accessory device.

15. The method of claim 14, wherein:
the first and second pull-up resistors have fixed resistance values that are independent of the device type of the electronic accessory device; and the first and second pull-down resistors have resistance values corresponding to the device type of the electronic accessory device.

16. The method of claim 14, wherein:
the detection circuitry comprises an analog-to-digital converter (ADC) configured to detect the first and second analog voltage levels; and the first and second pull-down resistors have resistance values that:

cause the first and second analog voltage levels to be greater than or equal to a minimum voltage threshold for digital communications over the plurality of communication lines, and cause a difference between the first and second analog voltage levels to satisfy a minimum resolution requirement of the ADC.

17. The method of claim 12, wherein transmitting data to the electronic accessory device in accordance with the device type of the electronic accessory device includes transmitting a command that is specific to the device type of the electronic accessory device.

18. The method of claim 12, wherein the method further includes:

at the host processor:

waking from a low power state upon receiving the device type of the electronic accessory device from the detection circuitry.

19. The method of claim 12, wherein the method further includes, upon disconnection of the electronic accessory device from the electronic host device:

at the host processor:

sending a command to the detection circuitry to control the multiplexer to couple the plurality of communication lines to the detection circuitry, and transitioning to a low power state.

20. The method of claim 12, wherein:
the first accessory ID information of the electronic accessory device comprises a general device category; and the second accessory ID information of the electronic accessory device comprises a more-specific category, including the device type.

\* \* \* \* \*